(12) United States Patent
Dick et al.

(10) Patent No.: US 7,557,619 B1
(45) Date of Patent: Jul. 7, 2009

(54) DIGITAL FREQUENCY SYNTHESIS

(75) Inventors: Christopher H. Dick, San Jose, CA (US); Frederic J. Harris, Lemon Grove, CA (US)

(73) Assignee: XILINX, Inc., San Jose, CA (US)

( * ) Notice: Subject to any disclaimer, the term of this patent is extended or adjusted under 35 U.S.C. 154(b) by 0 days.

(21) Appl. No.: 12/045,640

(22) Filed: Mar. 10, 2008

(51) Int. Cl.
*H03B 21/00* (2006.01)

(52) U.S. Cl. .................................. 327/106; 327/107

(58) Field of Classification Search .......... 327/105–107
See application file for complete search history.

(56) References Cited

U.S. PATENT DOCUMENTS

| | | | | |
|---|---|---|---|---|
| 4,901,265 A | * | 2/1990 | Kerr et al. | 708/276 |
| 5,014,231 A | * | 5/1991 | Reinhardt et al. | 708/271 |
| 5,977,804 A | * | 11/1999 | Beech | 327/107 |
| 6,333,649 B1 | * | 12/2001 | Dick et al. | 327/105 |
| 6,483,388 B2 | * | 11/2002 | Khan | 331/18 |
| 7,242,225 B2 | * | 7/2007 | Klage | 327/106 |

* cited by examiner

*Primary Examiner*—Lincoln Donovan
*Assistant Examiner*—William Hernandez
(74) *Attorney, Agent, or Firm*—W. Eric Webostad

(57) ABSTRACT

Method and apparatus for digital frequency synthesis are described. A frequency synthesizer has an accumulator, an adder, and a predictive filter. The adder is configured to subtract a predicted error from a phase profile signal. A quantized version of the phase profile signal is separated from an error portion thereof. The predictive filter, set for a fraction of a sample frequency bandwidth, is coupled to receive the error portion for generation of a next predicted error. A storage device has digital representations of sinusoidal signals accessible responsive to the quantized version of the phase profile signal. A digital-to-analog converter is coupled to receive a digital representation of a sinusoidal signal obtained from the storage device to provide an analog sinusoidal signal. An anti-imaging filter is coupled to receive the analog sinusoidal signal and configured to filter out noise.

20 Claims, 4 Drawing Sheets

DIGITAL FREQUENCY SYNTHESIS

FIELD OF THE INVENTION

One or more aspects of the invention relate generally to integrated circuits and, more particularly, to digital frequency synthesis.

BACKGROUND OF THE INVENTION

Digital communications equipment conventionally produces an analog sinusoid for transmission of information. This analog sinusoid is conventionally utilized in the up-conversion stage of a transmitter and the down-conversion stage of a receiver.

Others have constructed such an analog sinusoid waveform using digital techniques to generate a discrete version of the target signal and then provide the analog sinusoid waveform using a digital-to-analog converter ("DAC") and, post-DAC, an anti-imaging filter. Known examples of anti-imaging filters include Bessel, Elliptic, Butterworth, and Chevychev, among others. Prior to the DAC, a digital sinusoid signal may be realized using a look-up table ("LUT") memory. Accordingly, others have coupled an accumulator, quantizer, LUT memory, DAC, and anti-imaging filter in series as a frequency synthesizer architecture for Direct Digital Synthesis ("DDS"). For a bandwidth of interest, the spectral region over which such analog sinusoid is to be generated may be a fraction of the entire Nyquist ("sample frequency") bandwidth.

The quality of an analog waveform of a DDS system may be defined at least in part by the spurious free dynamic range ("SFDR") of a sinusoid signal produced. This metric defines the difference between amplitude of the highest spurious signal and a target sinusoid component or signal of the spectra produced. Accordingly, it would be desirable to suppress amplitude of spurious signals or tones of a spectra to enhance the SFDR. However, suppression of spurious tones conventionally involves increasing the address bus of the LUT memory, and this means that the amount of memory used is correspondingly increased. Additionally, to enhance quality of the digital-to-analog conversion, the DAC may likewise conventionally need to be able to handle larger sample sizes obtained from the LUT. Either or both increased memory size for the LUT or increased capability of the DAC leads to a significant increase in overhead.

SUMMARY OF THE INVENTION

Accordingly, it would be desirable and useful to provide means to provide a target component signal or tone with sufficient spectral clarity but with less overhead than a conventional system of equivalent spectral clarity.

One or more aspects of the invention generally relate to integrated circuits and, more particularly, to digital frequency synthesis.

An aspect of the invention is a frequency synthesizer having an accumulator coupled to receive a phase increment value and configured to provide a phase profile signal. An adder is coupled to receive the phase profile signal and a predicted error from a predictive filter. The adder is configured to subtract the predicted error from the phase profile signal. Busing is coupled to the adder to separate a quantized version of the phase profile signal from an error portion thereof. The predictive filter is coupled to receive the error portion for generation of a next predicted error. The predictive filter is for a fraction of a sample frequency bandwidth. A storage device has digital representations of sinusoidal signals coupled to receive the quantized version of the phase profile signal. A digital-to-analog converter is coupled to receive a digital representation of a sinusoidal signal obtained from the storage device responsive to the quantized version of the phase profile signal. The digital-to-analog converter is configured to provide an analog sinusoidal signal responsive to the digital representation of sinusoidal signal obtained from the storage device. An anti-imaging filter is coupled to receive the analog sinusoidal signal and configured to filter out noise.

Another aspect of the invention is a method for frequency synthesis which obtains a phase increment. The phase increment is accumulated to provide a first phase profile signal. A first predicted error is subtracted from the first phase profile signal to provide a noise shaped second phase profile signal. The second phase profile signal is quantized into a first portion and a second portion. At least one sinusoidal sample stored is accessed responsive to the first portion. A second predicted error is generated responsive to the second portion. The first predicted error and the second predicted error are for a fraction of a sample frequency bandwidth. At least one sinusoidal sample is converted into an analog signal. The analog signal is anti-image filtered.

Yet another aspect of the invention is a method for frequency synthesis which sets a corner frequency to a fraction of a sample frequency bandwidth. Coefficients of a predictive filter are set responsive to the corner frequency. For a sequence of clock periods, digital phase profile signals are generated. Errors associated with quantizing the digital phase profile signals are predicted. The digital phase profile signals are subtracted from the errors associated therewith for providing respective noise-shaped digital phase profile signals. The noise-shaped digital phase profile signals are separated into first digital portions and second digital portions. Stored digital samples are accessed responsive to the first digital portions to provide sinusoidal samples. The second digital portions are input to the predictive filter for the predicting of the errors, wherein the errors are predicted responsive to the second digital portions. Sinusoidal samples are first digital-to-analog converted to a first analog signal. The first analog signal is first anti-image filtered.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
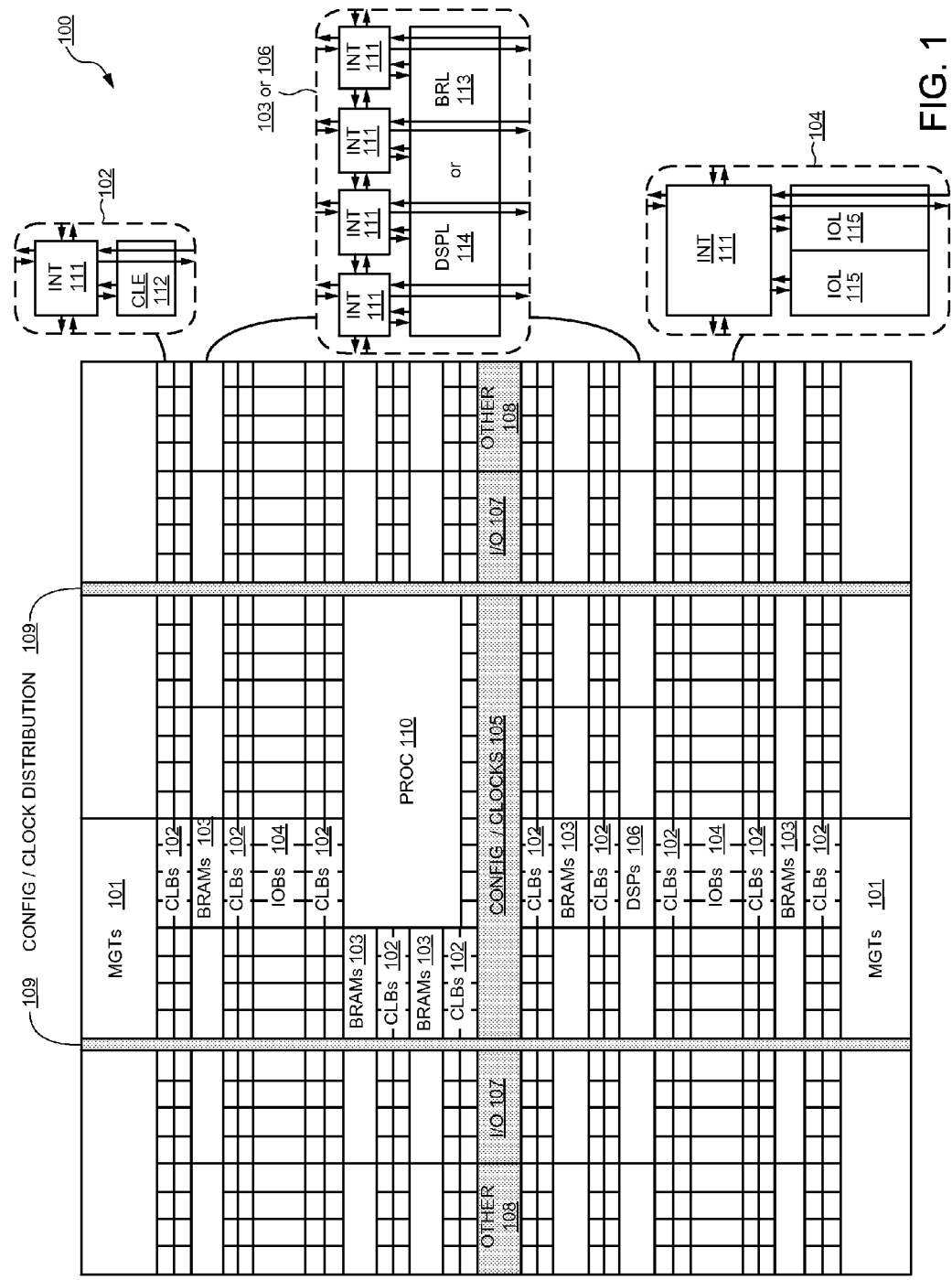
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex™-4 or Virtex™-5 FPGA from Xilinx, Inc. of San Jose, Calif.

Figure 2:
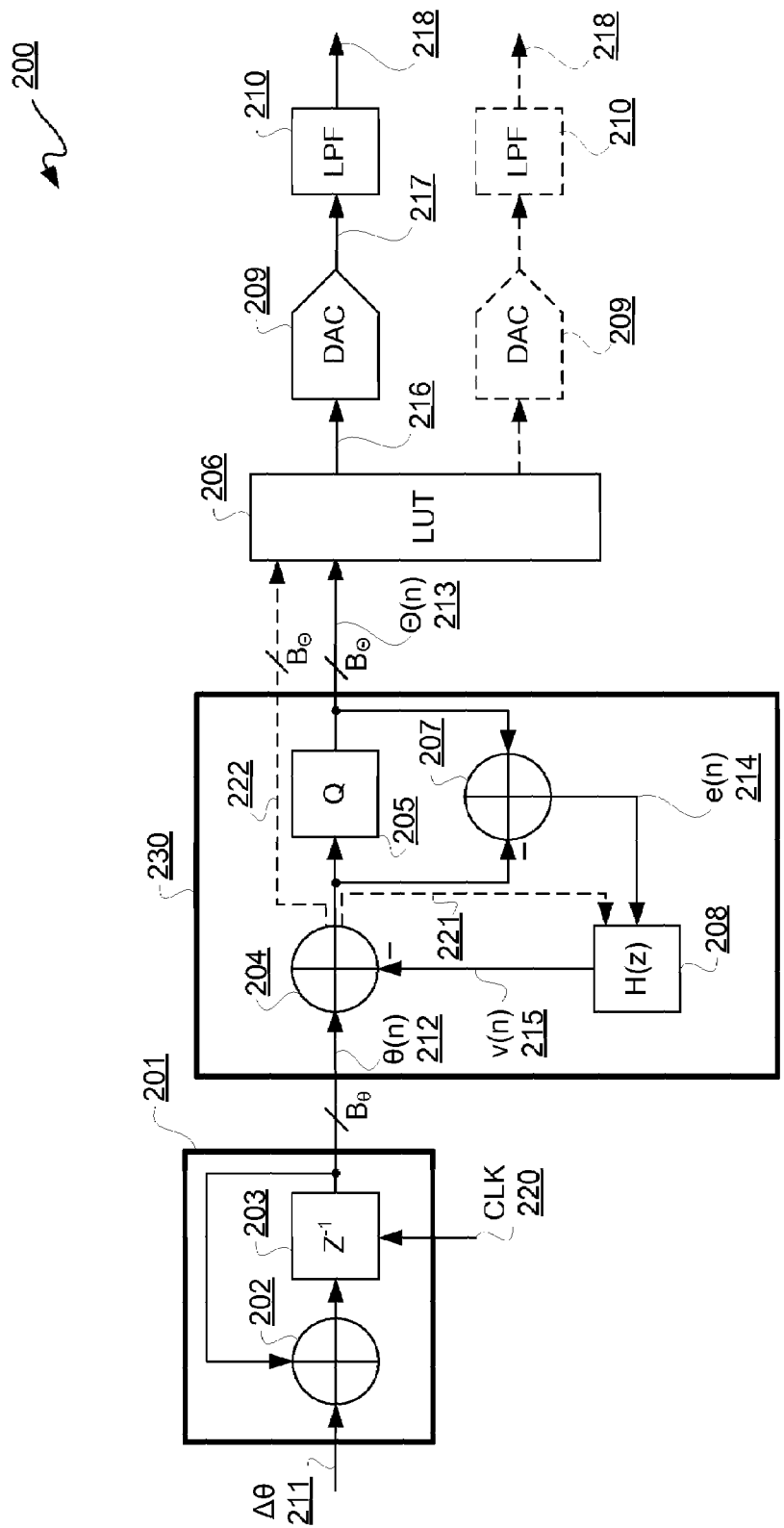
FIG. 2 is a block diagram depicting an exemplary embodiment of an architecture for a Direct Digital Synthesis ("DDS") system.

FIG. 2 is a block diagram depicting an exemplary embodiment of an architecture for a Direct Digital Synthesis ("DDS") system 200. DDS system 200 uses noise shaping in trading off bandwidth for spurious free dynamic range ("SFDR"). More particularly, by using noise shaping as described below in additional detail, a trade-off between output bandwidth and spectral quality is facilitated.

DDS system 200 includes accumulator 201. Accumulator 201 may be what is known as an "overflow" or "wrapping" accumulator. Accumulator 201 is a phase accumulator configured to provide a phase slope signal. Conventionally, a phase slope signal may be referred to as a saw-tooth or ramping signal. Phase increment ($\Delta\theta$) 211 is provided as an input to an adder 202 of accumulator 201. Output of adder 202 is provided to register 203 of accumulator 201. Output of register 203 is provided as a phase slope or profile signal ($\theta(n)$) ("phase profile") 212. Phase profile 212 from register 203 is fed back as an input to adder 202 and fed forward as an output from accumulator 201 and provided as an input to adder 204. Adder 204 is a component of noise shaping circuitry 230

Accordingly, bits are accumulated in register 203, and phase profile 212 is incremented responsive to the value of phase increment 211 for a number of clock cycles of clock signal 220 provided to register 203. In other words, the overflow condition occurs responsive to a number of clock cycles being equivalent to the length of register 203. Register 203 may be implemented as a 1×N array of flip-flops, for the length N an integer greater than one, for storing multiple bits. When the length of register 203 is exceeded, namely a maximum number of bits are stored in register 203, an overflow condition results. This overflow condition causes output of register 203 to return to zero, and thus produces a saw-tooth wave form.

In this example, it shall be assumed for purposes of clarity that the length of register 203 is a sufficiently large number of bits for a target frequency resolution of DDS system 200. In other words, bit precision of accumulator 201 of $B_\theta$ bits is sufficiently large, such that a target frequency resolution may be obtained. For this example it shall be assumed that $B_\theta$ bits is from 24 to 32 bits, inclusive. Thus, for $B_\theta$ bits equal to 24, 24 clock cycles of clock signal 220 may be used to clock in 24 phase increment values 211 which are accumulated in register 203 for each ramp or phase slope to provide phase profile 212 from accumulator 201 which is $B_\theta$ bits wide. On a twenty-fifth clock cycle, $B_\theta$ bits represent a zero value, namely return to a zero value. Notably, though single lines and single blocks in instances may be illustratively shown, it should be appreciated that multiple signal lines and multiple blocks may be used for implementing DDS system 200, and single instances are merely shown for purposes of clarity and not limitation.

Thus, it should be appreciated that phase profile 212 from register 203 is responsive to the value of phase increment 211, and the period of phase profile 212 is responsive to the length of register 203. Phase profile θ(n) 212, for n an nth instant of time, after processing by adder 204, as described below in additional detail, is provided to quantizer 205. Quantizer 205 may be implemented as a bus "ripper". It should be appreciated that $B_\Theta$ bits, which defines the frequency resolution of DDS system 200, is output from quantizer 205. Be may be raised as an exponent of 2, namely $2^{B_\Theta}$, to determine the size of look-up table ("LUT") memory 206. The output frequency, $f_{out}$, of DDS system 200 may mathematically expressed as:

$$f_{out} = \frac{f_{clk} \Delta \theta}{2^{B_\Theta}}, \qquad (1)$$

where $f_{clk}$ is the frequency of a system clock, such as clock signal 220, and $B_\Theta$ is the number of Most Significant Bits ("MSBs") extracted from quantizer 205 and $B_\Theta$ bits are used as an address bus for LUT 206. Thus, because a memory, such as used for implementing LUT 206, is used to store digital sinusoid samples, phase profile 212 is quantized to reduce memory overhead. In other words, in order to convert phase profile 212 into a time series using LUT 206 in an FPGA, quantization is used to allow an FPGA-implemented LUT 206 to accommodate a depth of $2^{B_\Theta}$. Quantizer 205 strips off least significant bits, only allowing MSBs, namely $B_\Theta$, to be provided to an address bus of LUT 206. Even though depth of LUT 206 may be a more manageable number, frequency resolution is diminished as not all of $B_\theta$ bits are provided as input to LUT 206.

For this architecture, the amplitude of the largest spur is approximated by 6 dB multiplied by the number of bits of frequency resolution, namely approximately $B_\Theta$ dB. Thus, for example, if $B_\Theta$ is 16 bits, the amplitude of the largest spurious tone is approximately 96 dB, or more particularly −96 dB as described below in additional detail.

Suppose for example that LUT 206 has 256 entries, namely an 8-bit address bus, and $f_{out}$ is 0.022 Hz. A highest spurious tone, which does not include a target tone component such as a carrier signal ("carrier"), may be located at approximately 0.14 Hz, and may be suppressed with respect to the target signal component by approximately 48 dB, namely 8×6 dB of spur suppression. The highest spur may be $-6 \times \log_2(256)$, which is equal to −48 dB. In other words, the peak of the highest spur is at −48 dB. Accordingly, the highest spur is suppressed by approximately 48 dB with respect to the carrier. This difference between the peak of the carrier and the peak of the highest spur is generally referred to as the SFDR.

The quality of an analog wave form may be generally captured by specifying the SFDR of a carrier signal. Because this SFDR specified metric defines the amplitude of the highest spurious signal with respect to a desired signal component, such as a carrier, as the absolute value of the SFDR becomes smaller, the quality of the sinusoid will be poorer, or in other words have a lower spectral purity.

Notably, the amplitude of a spur is generally a function of the depth of LUT 206 and the precision of the output of digital-to-analog converter "DAC" 209 coupled to receive samples 216 output from LUT 206. Input to LUT 206 is an address, namely phase profile (Θ(n)) 213, which is phase profile 212 after quantization. Total quantization noise power in an output signal 218 from DDS system 200 may be fixed; however, the spectral distribution of the noise may be shaped such that some regions in the output spectrum provide greater spectral purity or clarity than other regions in such output spectrum. More particularly, a region on a side or regions on both sides of a desired signal component, such as a carrier, may have a greater spectral purity, namely less noise, than other regions by using noise shaping as described herein.

In order to achieve enhanced spectral purity about a target component signal, a trade-off may be made between output bandwidth and spectral quality. In other words, the output bandwidth may be reduced in order to enhance the spectral quality of a region or regions adjacent to a target component signal, such as a carrier. As is known, the maximum frequency of a tone, such as a carrier, is approximately the sampling frequency, $f_s$, divided by two. However, it may be sufficient for a sinusoid to reside in a band of frequencies that occupies only a fraction of the Nyquist bandwidth. The remainder of this description describes how spurious tones are suppressed by using noise shaping.

Spurious components may behave like a carrier albeit at a lower level than a carrier with respect to strength of signal. Having spurious components behave like a carrier either may translate an undesired band of frequencies to a baseband in a receiver or may unintentionally populate spectral regions of a transmission waveform with copies of a baseband waveform in a transmitter. To reduce the probability of either or both of these undesirable events, amplitude of spurious components may be reduced as described herein, without having to increase the depth of LUT 206.

Returning to FIG. 2, it shall be assumed for purposes of clarity by way of example and not limitation, that $B_\theta$ is 32 bits and Be is 16 bits. Accordingly, sample sizes in each of the 216 entries of LUT 206 may be at least 16 bits wide, and may be larger, such as 17 bits wide, to address additive noise due to noise introduced by both quantizer 205 and LUT 206.

Responsive to quantized phase profile 213, LUT 206 produces a sinusoid sample 216. Sinusoid sample 216 is $B_q$ bits and is input to DAC 209. Continuing the above example, it shall be assumed that $B_q$ bits is approximately 16 or 17 bits. DAC 209 converts $B_q$ bits of sinusoid sample 216 to an analog signal 217. Due to this conversion, analog signal 217 may have image spectra, as is known. For example, assuming for purposes of clarity by way of example and not limitation that output sinusoid 218 of DDS 200 is to reside in a band of frequencies which are 25% of the Nyquist bandwidth namely, $f_s/4$. Then it may be said that the zone of greatest interest occurs at the baseband approximately centered at $f_s/4$ and image spectra are generated at each $f_s$ interval therefrom in both positive and negative directions. Providing analog signal 217 to a low pass filter ("LPF") 210 removes unwanted image spectra generated by DAC 209. Accordingly, LPF 210 may be thought of as an anti-imaging filter.

Notably, it should be appreciated that sample signal 216 may be either a cosine sample or a sine sample, namely cos(Θ(n)) or sin(Θ(n)), or both. Notably, if both sine and cosine samples are produced by LUT 206, sample signal 216 may be $B_q$ bits for each sample without having to increase size of LUT 206 by using a geometric relationship between sine and cosine. Conventionally, only one-quarter of a full cycle of a sine or cosine sinusoid is stored, and the other sinusoid, cosine or sine, as well as the other three-quarters of both sinusoids are generated by complementing either address or output values, or both. However, another instance of DAC 209 and LPF 210 may be implemented to handle both sine and cosine samples, as generally indicated in phantom by the use of dashed lines in FIG. 2 to illustratively show a second DAC 209 and a second LPF 210. Furthermore, separate sine and cosine outputs 218 may be provided. However, for purposes of clarity and not limitation, it shall be assumed that only cosine samples are processed, and accordingly output 218 is $\cos(\Theta(t))$ for t time.

For DDS system 200, analog output sinusoid 218 occupies a fraction of the spectral region of a Nyquist bandwidth to support output bandwidth noise shaping. Both amplitude of one or more spurs and amplitude of the noise floor power in a spectral region of interest, such as about a carrier, are suppressed.

To understand noise-shaping, it should be understood that phase profile 212 bits are provided to adder 204 for input to quantizer 205 and input to adder 207, all of noise-shaping circuitry 230. Output of quantizer 205, namely phase profile 213 bits, is provided to LUT 206 and to adder 207. As the input to adder 207 from adder 204 is provided to a minus port, the difference output from adder 207 as between phase profiles 213 and 212 is an error signal (e(n)) 214. Error signal 214 may be the least significant bits of phase profile 212. Accordingly, quantizer 205 and adder 207 may be replaced by busing, namely busing the MSBs output from adder 204 directly to an address bus of LUT 206 as indicated by dashed line 222 and busing the LSBs output from adder 204 directly to filter 208 as indicated by dashed line 221.

Filter 208 is a predictive filter. As predictive filters are known, filter 208 is not described in unnecessary detail. The coefficients of the transfer function used to implement a predictive filter 208 may generally be selected according to the application of use. In this example, predictive filter 208 may be implemented as a Finite Impulse Response ("FIR") filter. Output of predictive filter 208 responsive to error signal 214 is a predicted error (v(n)) signal ("predicted error") 215. Predicted error 215 is provided to a minus port of adder 204 for subtraction from phase profile 212. It should be appreciated that as DDS system 200 is clocked, the predicted error, which may be based on a history of errors e(n), is for a next phase profile. In other words, predicted error 215 is a prediction of the error of phase profile θ(n) 212 input to adder 204 from which such predicted error signal 215 is subtracted. In short, predicted error 215 is predicted for an associated phase profile 212 generally prior to such phase profile instance being provided to adder 204. Because LSBs may be directly output from adder 204 as input to predictive filter 208 and MSBs may be output directly from adder 204 to an address bus input of LUT 206, dashed lines 221 and 222, respectively, are illustratively shown to indicate such busing.

Accordingly, it should be appreciated that the addition of noise-shaping circuitry 230 to a conventional DDS system implemented using accumulator 201, quantizer 205, LUT 206, DAC 209, and LPF 210 does not add a significant amount of overhead. Furthermore, because predicted error 215 is subtracted from phase profile 212, a low-precision bit-field forming an address index, namely phase profile 213, to LUT 206, which may be a sine/cosine LUT, means that a lower precision DAC 209 may be used to produce what appears like the output of a higher precision DAC.

Predictive filter 208 has coefficients which are selected for the effective output operating bandwidth, namely the coefficients are selected responsive to a corner frequency which is a fraction of the Nyquist bandwidth. In the above example, predictive filter 208 is implemented for supporting 25% of the Nyquist bandwidth. Such Nyquist bandwidth is specified by predictive filter 208 coefficients. Alternatively, less than 25% of the Nyquist frequency bandwidth may be supported to effect greater spur amplitude suppression, and noise floor power suppression in a region or regions adjacent to a target tone. While not wishing to be bound by theory, it is believed that for most carrier applications, using one quarter of the sample frequency, namely setting the corner frequency to 25% of the usable output bandwidth, results in sufficient spectral clarity for most carrier applications where bandwidth may be limited to one-quarter of the sample frequency bandwidth, namely amplitude suppression of any and all spurs and noise floor power suppression within such a limited band. For a wider bandwidth waveform, namely from 25% to approximately 40% of the Nyquist frequency output bandwidth, sufficient spur amplitude suppression and noise floor suppression for many carrier and other analog waveform producing applications may be obtained.

It should be appreciated that the effectiveness of predictive filter 208 decreases as the corner frequency increases, namely as the output bandwidth increases. It should be appreciated that the use of LPF 210 with the addition of noise shaping circuit 230 has two effects. In addition to removing image spectra, LPF 210 removes noise beyond the effective range of predictive filter 208. Accordingly, it should be appreciated that output bandwidth is in effect exchanged for dynamic range at the signal level, and at the architecture level, memory depth of LUT 206 and bit precision of DAC 209 need not be increased in order to realize a higher precision signal. Circuit resources are conserved as only a modicum of addition of circuit resources of noise shaping circuit 230 results in a significant increase in the quality of output waveform.

Figure 3A:
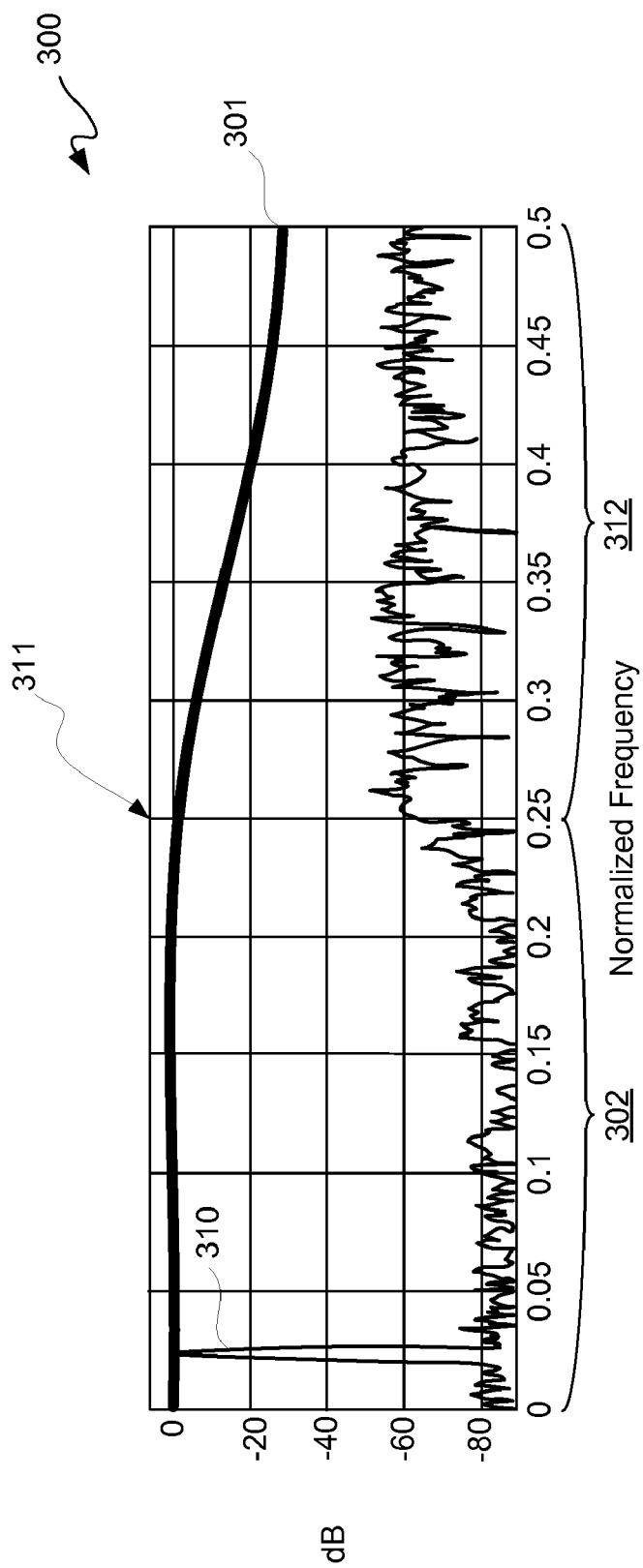
FIG. 3A is a signal diagram depicting an exemplary embodiment of normalized frequency versus decibels for a noise-shaped output waveform spectrum.

FIG. 3A is a signal diagram depicting an exemplary embodiment of normalized frequency versus decibels for a noise-shaped output waveform spectrum 300. Notably, output waveform spectrum 300 may be for output signal 217 of FIG. 2. Noise-shaped output waveform spectrum 300 therefore is prior to application of low pass filtering with LPF 210. A target tone or component 310, such as a carrier, of spectrum 300 has substantial spectra clarity in a region 302. Notably, in region 302, one or more spurious tones have been suppressed by use of noise-shaping, as previously described with reference to noise-shaping circuitry 230 of FIG. 2. Furthermore, it should be appreciated that region 302 is a fraction of the Nyquist bandwidth, namely a fraction as determined by setting a corner frequency 311, which in this example is $f_s/4$.

Line 301 indicates a magnitude response of a fourth-order Butterworth anti-imaging filter, which may be used for LPF 210 of FIG. 2. It should be appreciated that after corner frequency 311, namely region 312, amplitude of one or more spurious tones is greater than in region 302, which is prior to corner frequency 311. Furthermore, it should be appreciated that the noise floor power in region 302 is lower than the noise floor power in region 312.

Figure 3B:
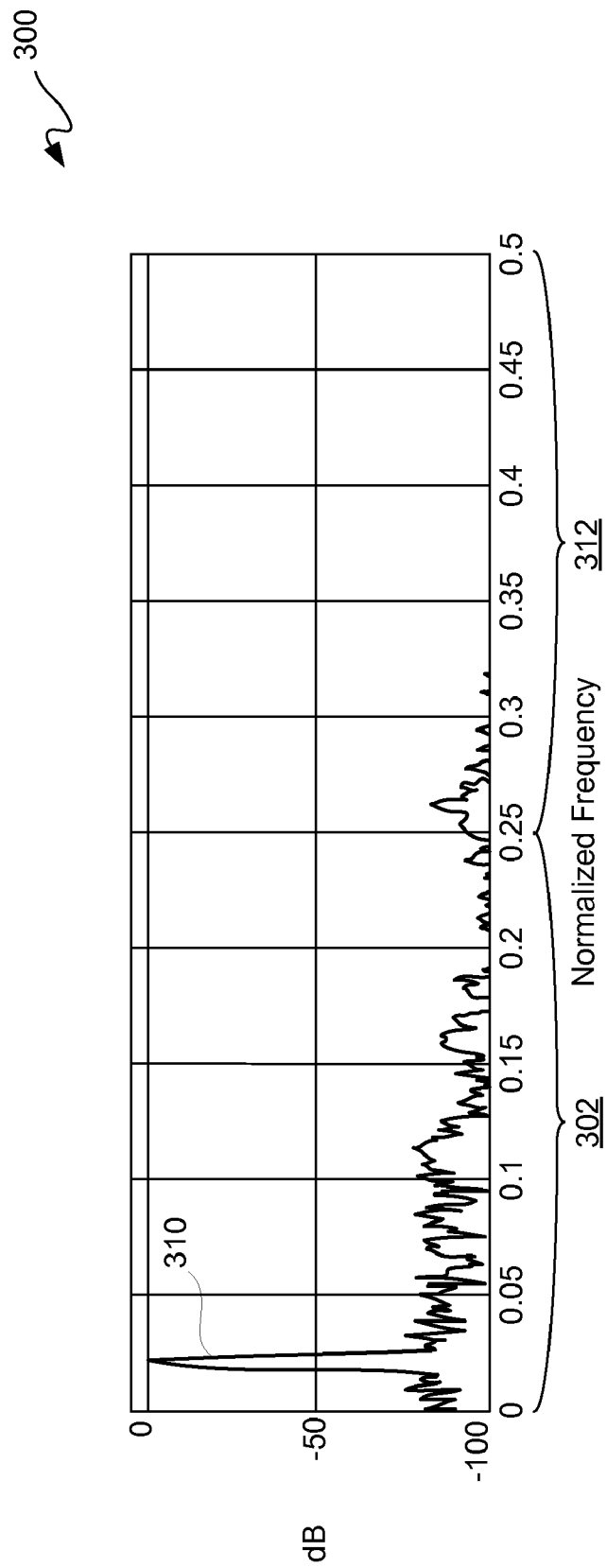
FIG. 3B is a signal diagram depicting an exemplary embodiment of the noise-shaped output waveform spectrum of FIG. 3A after application of low pass filtering, such as by a low pass filter ("LPF").

FIG. 3B is a signal diagram depicting an exemplary embodiment of the noise-shaped output waveform spectrum 300 of FIG. 3A but after application of low pass filtering, such as by LPF 210 of FIG. 2. Accordingly, after low pass filtering it should be appreciated that spurious tones and other noise in region 312 are significantly suppressed or entirely absent. Notably, in both FIGS. 3A and 3B, for the most part only the positive side of the spectrum is shown, and there may be a negative frequency range as well which is not shown for purposes of clarity and not limitation. Thus, it should be appreciated that output waveform spectrum 300 of FIG. 3B may be the output waveform generated by a DDS system, such as output sinusoid 218 generated by DDS system 200 of FIG. 2. In the example of FIGS. 3A and 3B, a 12-bit DAC was used; however, other DAC bit sizes may be used. While not wishing to be bound by theory, the output dynamic range of a conventional 12-bit DAC generally will be approximately 72 dB. However, by using noise-shaping as described herein, effectively the output waveform of FIG. 3B indicates approximately a 14-bit DAC over the bandwidth of interest, namely region 302. This indicates a significant improvement in spectral clarity with only a modicum of additional circuitry in comparison to the additional circuitry conventionally used to provide such spectral quality.

In summary, it should be appreciated that a noise-shaping digital frequency synthesizer has been described. Such noise-shaping digital frequency synthesizer is a DDS system configured to exchange waveform signal-to-noise ratio ("SNR") for output bandwidth. Furthermore, the noise-shaping digital frequency synthesizer exchanges memory footprint for added multipliers, such as may be used to implement a predictive filter, which are targeted to a specified output signal quality-of-result ("QOR") for a fraction of a sample frequency bandwidth. Furthermore, it should be appreciated that such a noise-shaping frequency synthesizer may deliver an enhanced dynamic range above that expected from a conventional linear DAC of equivalent bit width.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A frequency synthesizer, comprising:
   an accumulator coupled to receive a phase increment value and configured to provide a phase profile signal;
   an adder coupled to receive the phase profile signal and a predicted error from a predictive filter, the adder configured to subtract the predicted error from the phase profile signal;
   busing coupled to the adder to separate a quantized version of the phase profile signal from an error portion thereof;
   the predictive filter coupled to receive the error portion for generation of a next predicted error;
   the predictive filter being for a fraction of a sample frequency bandwidth;
   a storage device having digital representations of sinusoidal signals coupled to receive the quantized version of the phase profile signal;
   a digital-to-analog converter coupled to receive a digital representation of a sinusoidal signal obtained from the storage device responsive to the quantized version of the phase profile signal;
   the digital-to-analog converter configured to provide an analog sinusoidal signal responsive to the digital representation of sinusoidal signal obtained from the storage device; and
   an anti-imaging filter coupled to receive the analog sinusoidal signal and configured to filter out noise.

2. The frequency synthesizer according to claim 1, wherein the fraction is at most 40% of the sample frequency bandwidth.

3. The frequency synthesizer according to claim 1, wherein the fraction is at most 25% of the sample frequency bandwidth.

4. The frequency synthesizer according to claim 1, wherein the quantized version of the phase profile signal is Most Significant Bits of the phase profile signal; and
   wherein the error portion of the phase profile signal is Least Significant Bits of the phase profile signal.

5. The frequency synthesizer according to claim 4, wherein the phase profile signal has a slope responsive to the phase increment value and a period responsive to an overflow condition of the accumulator and a clock signal.

6. The frequency synthesizer according to claim 5, wherein the frequency synthesizer is implemented in a Field Programmable Gate Array.

7. A method for frequency synthesis, comprising:
   obtaining a phase increment;
   accumulating the phase increment to provide a first phase profile signal;
   subtracting a first predicted error from the first phase profile signal to provide a noise shaped second phase profile signal;
   quantizing the second phase profile signal into a first portion and a second portion;
   accessing at least one sinusoidal sample stored responsive to the first portion;
   generating a second predicted error responsive to the second portion, the first predicted error and the second predicted error being for a fraction of a sample frequency bandwidth;
   converting the at least one sinusoidal sample into an analog signal; and
   anti-image filtering the analog signal.

8. The method according to claim 7, wherein the first portion is Most Significant Bits of the second phase profile signal; and
   wherein the second portion is Least Significant Bits of the second phase profile signal.

9. The method according to claim 8, wherein the fraction is at most 40% of the sample frequency bandwidth.

10. The method according to claim 8, wherein the fraction is at most 25% of the sample frequency bandwidth.

11. The method according to claim 8, wherein the accumulating of the phase increment provides the phase profile signal with a slope and a period, the period being responsive to an overflow condition of an accumulator and responsive to a clock signal for clocking registers of the accumulator to register the phase increment.

12. The method according to claim 8, wherein the at least one sinusoidal sample is selected from a group consisting of at least one of cosine samples and sine samples.

13. A method for frequency synthesis, comprising:
    setting a corner frequency for a fraction of a sample frequency bandwidth;
    setting coefficients of a predictive filter responsive to the corner frequency; and
    for a sequence of clock periods:
      generating digital phase profile signals;
      predicting errors associated with quantizing the digital phase profile signals;
      subtracting from the digital phase profile signals the errors associated therewith for providing respective noise-shaped digital phase profile signals;
      separating the noise-shaped digital phase profile signals into first digital portions and second digital portions;
      accessing stored digital samples responsive to the first digital portions to provide sinusoidal samples;
      inputting the second digital portions to the predictive filter for the predicting of the errors, wherein the errors are predicted responsive to the second digital portions;
      first digital-to-analog converting of the sinusoidal samples to a first analog signal; and
      first anti-image filtering the first analog signal.

14. The method according to claim 13, wherein the first anti-image filtering is low-pass filtering.

15. The method according to claim 13, further comprising accumulating phase increments responsive to a clock signal for the generating of the digital phase profile signals.

16. The method according to claim 13, further comprising:
   second digital-to-analog converting of the sinusoidal samples to a second analog signal; and
   second anti-image filtering the second analog signal.

17. The method according to claim 16, wherein the first analog signal is a cosine sinusoid; and
   wherein the second analog signal is a sine sinusoid.

18. The method according to claim 13, wherein the fraction is at most 40% of the sample frequency bandwidth.

19. The method according to claim 13, wherein the fraction is at most 25% of the sample frequency bandwidth.

20. The method according to claim 13, wherein the first analog signal is located within the fraction of the sample frequency bandwidth; and
   wherein prior to the first anti-imaging filtering, the first analog signal has greater noise and spur suppression within the fraction of the sample frequency bandwidth than outside of the fraction of the sample frequency bandwidth.

* * * * *